United States Patent [19]

Uchinami

[11] Patent Number: 5,349,936
[45] Date of Patent: Sep. 27, 1994

[54] METHOD OF DIAGNOSING EXHAUST GAS RECIRCULATION CONTROL SYSTEM OF INTERNAL COMBUSTION ENGINE AND APPARATUS FOR CARRYING OUT THE SAME

[75] Inventor: Masanobu Uchinami, Himeji, Japan

[73] Assignee: Mitsubishi Denki Kabushiki Kaisha, Tokyo, Japan

[21] Appl. No.: 100,430

[22] Filed: Aug. 2, 1993

[30] Foreign Application Priority Data

Aug. 5, 1992 [JP] Japan .................................. 4-209106

[51] Int. Cl.[5] .............................................. F02M 25/07
[52] U.S. Cl. ..................... 123/676; 123/571; 73/117.3
[58] Field of Search ................ 123/571, 676; 73/117.3

[56] References Cited

U.S. PATENT DOCUMENTS

| | | | |
|---|---|---|---|
| 4,397,289 | 8/1983 | Haka et al. | 123/571 |
| 4,428,354 | 1/1984 | Sundeen et al. | 123/571 |
| 4,541,398 | 9/1985 | Kishi | 123/571 |
| 4,548,185 | 10/1985 | Pozniak | 123/571 |
| 4,715,348 | 12/1987 | Kobayashi et al. | 123/571 |
| 4,825,841 | 5/1989 | Norota et al. | 123/571 |
| 5,152,273 | 10/1992 | Ohuchi | 123/571 |
| 5,190,017 | 3/1993 | Cullen et al. | 123/571 |
| 5,193,513 | 3/1993 | Marko et al. | 123/571 |
| 5,241,940 | 9/1993 | Gates, Jr. | 123/571 |
| 5,257,610 | 11/1993 | Ohuchi | 123/571 |
| 5,297,047 | 3/1994 | Matsuno | 73/117.3 |
| 5,309,887 | 5/1994 | Kondo et al. | 123/571 |

*Primary Examiner*—E. Rollins Cross
*Assistant Examiner*—Thomas N. Moulis
*Attorney, Agent, or Firm*—Sughrue, Mion, Zinn, Macpeak and Seas

[57] ABSTRACT

A method of diagnosing an exhaust gas recirculation control system of an engine as to occurrence of a fault in the system. The state of a pressure sensor incorporated in the exhaust gas recirculation system for controlling the recirculation is checked with the aid of various parameters involved in operation of the engine. When the pressure sensor is found as suffering from abnormality such as freezing and inoperative, execution of the diagnosis or result obtained after execution of the diagnosis is invalidated.

12 Claims, 6 Drawing Sheets

METHOD OF DIAGNOSING EXHAUST GAS RECIRCULATION CONTROL SYSTEM OF INTERNAL COMBUSTION ENGINE AND APPARATUS FOR CARRYING OUT THE SAME

BACKGROUND OF THE INVENTION

1. Field of the Invention

The present invention relates generally to a method of diagnosing an exhaust gas recirculation control system of an internal combustion engine primarily for a motor vehicle. More particularly, the invention is concerned with an exhaust gas recirculation control system diagnosis method capable of positively avoiding erroneous decision in the diagnosis upon occurrence of abnormality such as freezing of moisture in a pressure sensor means employed in the exhaust gas recirculation control system. The invention is also concerned with an apparatus for carrying out the method.

2. Description of the Related Art

In the internal combustion engine (hereinafter also referred to simply as the engine) for a motor vehicle, there is generally adopted an exhaust gas recirculation control system which includes an exhaust gas recirculation passage extending from an exhaust gas passage to an intake air passage for recirculating a part of the exhaust gas discharged from the engine to the intake air passage so that a maximum combustion temperature of a fuel is suppressed to such extent that $NO_x$ produced by the combustion and contained in the engine exhaust gas can be reduced. In that case, recirculation of the exhaust gas to the intake system is not constantly effected but the timing for effecting the exhaust gas recirculation as well as the amount of recirculation is controlled in dependence on the running or operation states of the engine by controlling correspondingly the actuation of an exhaust gas recirculation control valve installed in the exhaust gas recirculation passage. By way of example, in a low load range of the engine where combustion of the fuel is rather at a low level and generation of $NO_x$ is relatively insignificant, recirculation of the exhaust gas is interrupted. Further, it is generally practiced to control or limit the amount of recirculation of the exhaust gas so that content of the exhaust gas contained in the intake air remains substantially constant at a predetermined ratio.

In such exhaust gas recirculation control system, erroneous operation or occurrence of a fault in the exhaust gas recirculation control valve, a modulator for controlling the valve and other components of the system will provide obstacle to effectuation of the exhaust gas recirculation as desired. For coping with this inconvenience, there has been proposed an approach for diagnosing the exhaust gas recirculation control valve as to occurrence of some fault by detecting directly the actuated position of the recirculation control valve. This approach is however disadvantageous in that the exhaust gas recirculation control system is complicate in the structure and expensive, because there is required not only provision of a specific detector for detecting the actuated position of the exhaust gas recirculation control valve but also a processing apparatus for processing the information available from the output of the detector.

As a method of diagnosing the exhaust gas recirculation control system which can evade the aforementioned inconveniences, there may be mentioned a diagnosis method or system disclosed in Japanese Unexamined Patent Application Publication No. 11127/1988 (JP-A- 63-11127), according to which an exhaust gas recirculation control valve installed in an exhaust gas recirculation passage extending from an exhaust gas passage to an intake passage is temporarily manipulated (i.e., opened or closed) during recirculation of the exhaust gas to the intake passage on the condition that the engine load is stable, and a change in the suction pressure brought about by the manipulation of the control valve is detected, whereon decision is made as to whether the change in the suction pressure lies within a predetermined range. On the basis of the result of this decision, it is then determined if a fault occurs in the exhaust gas recirculation system.

The principle underlying this diagnosis method is based on the fact that actuation of the exhaust gas recirculation control valve is accompanied with a corresponding change in the suction pressure. Starting from this fact, it is contemplated to detect a fault occurring in the exhaust gas recirculation control valve and associated devices by checking the change of the suction pressure which is detected when a negative pressure playing a role in the actuation of the exhaust gas recirculation control valve is varied. To this end, it is necessary to apply directly the pressure prevailing within the exhaust gas passage or alternatively the suction pressure to the pressure sensor by providing a pressure introducing pipe. In this conjunction, it is however noted that moisture contained in the exhaust gas tends to be condensed as dew on the inner wall of the pressure introducing pipe or on the pressure sensor itself when the temperature of the exhaust gas is low. As a consequence, when the ambient temperature is below the freezing point, the condensate dew is frozen to decrease the flow section area of the pressure passage or the pressure sensor itself is frozen. In such situation, the change in the pressure of concern can no more be detected with any reliability. It goes without saying that diagnosis of the exhaust gas recirculation system in the state mentioned above will result in that the system suffers abnormality even when it operates normally, which leads to unnecessary generation of an abnormality alarm to the discomfort of the driver and/or wasteful exchange of components of the exhaust gas recirculation control system which suffer no fault.

As will be appreciated from the above description, in the known fault diagnosis method for the exhaust gas recirculation control system, no consideration is paid to dew condensation and freezing of moisture contained in the exhaust gas in the pressure introducing passage or on the pressure sensor itself. Thus, the known diagnosis method suffers a problem that the exhaust gas recirculation system which is operating normally may erroneously be decided to be abnormal due to inoperativeness of the pressure sensor.

SUMMARY OF THE INVENTION

In the light of the state of the art described above, it is an object of the present invention to provide a method of diagnosing an exhaust gas recirculation control system which can evade erroneous decision in the diagnosis attributable to abnormal state of the pressure sensor such as freezing with a view to solving the problems which the known diagnosis techniques suffer.

It is another object of the present invention to provide an apparatus for carrying out the above-mentioned diagnosis method.

The present invention is directed to an internal combustion engine equipped with an exhaust gas recirculation control system which includes an exhaust gas recirculation passage communicated to an exhaust gas passage and an intake air passage of the engine and an exhaust gas recirculation control valve disposed in the exhaust gas recirculation passage for selectively closing and opening the exhaust gas recirculation passage. In the internal combustion engine described above, the present invention is concerned with a method of diagnosing the exhaust gas recirculation control system as to occurrence of a fault, wherein the exhaust gas recirculation valve is temporarily manipulated during operation of the engine to thereby detect by pressure sensor means incorporated in the exhaust gas recirculation control system whether or not a change in pressure within one of the intake air passage and the exhaust gas passage brought about by the temporary manipulation of the exhaust gas recirculation control valve lies within a predetermined range, and a diagnosis is performed for the exhaust gas recirculation control system as to occurrence of a fault in the system on the basis of a result of the detection.

According to a first aspect of the invention, there are provided in the above-mentioned diagnosis method a step of making decision in response to an engine start switch signal generated for starting operation of the engine as to whether or not at least one of a cooling water temperature, an intake air temperature and an engine oil temperature of the engine upon starting thereof is lower than a predetermined lowest temperature at which the pressure sensor means can operate normally, and a step of invalidating the diagnosis of the exhaust gas recirculation control system unless at least one of the temperatures mentioned above is lower than the predetermined lowest temperature.

The arrangement described above starts from the fact that when at least one of the various temperatures mentioned above is lower than a predetermined temperature, there is a high possibility or probability that freezing occurs in the pressure sensor means which includes a pressure sensor and a pressure introducing pipe. Accordingly, in that case, the diagnosis is inhibited for thereby avoiding the inconveniences mentioned previously.

According to a second aspect of the invention, there are provided in association with the aforementioned diagnosis method a step responsive to a key switch signal for storing as a first pressure value a value of a pressure signal indicative of an atmospheric pressure immediately before a key switch was turned off in precedence, a step responsive to the key switch signal for storing as a second pressure value a value of a pressure signal indicative of the atmospheric pressure immediately after the key switch was turned on currently, and a step of deciding whether or not a pressure difference determined on the basis of a difference between the first pressure value and the second pressure value is greater than a predetermined value which corresponds to an error level possibly leading to erroneous diagnosis decision, wherein when the pressure difference is greater than the predetermined value, the diagnosis of the exhaust gas recirculation control system is invalidated.

The above arrangement is based on the fact that when the pressure difference mentioned above is greater than the predetermined value, there exists a high possibility that the pressure value outputted from the pressure sensor is significantly deviated from the actual pressure due to freezing in the pressure sensor means. Accordingly, in this case, execution of the diagnosis is invalidated.

According to a third aspect of the invention, there are provided in the aforementioned diagnosis method a step of making decision as to whether or not the engine is in a transient operation state, a step of storing and fetching values of a pressure signal corresponding to the pressure prevailing within one of the intake air passage and the exhaust gas recirculation control valve sequentially on a time-serial basis when the decision step mentioned above results in that the engine is in the transient state, and a step of making decision as to whether or not change in the successive pressure values remains smaller for a predetermined period than a predetermined value representing a change in the transient operation of the engine, wherein when the change in the successive pressure values remains smaller than the predetermined value, the diagnosis of the exhaust gas recirculation control system is invalidated.

The diagnosis method described above starts from the fact that when the change in the pressure values continues to be smaller than the predetermined value for a predetermined period notwithstanding of changes in the engine speed (rpm), load and other running state parameters of the engine in the transient operation state thereof, there exists a high probability that the pressure value available from the output of the pressure sensor remains unchanged due to freezing or other fault in the pressure sensor means that case, the diagnosis is invalidated for thereby preventing the erroneous decision in the diagnosis.

According to a fourth aspect of the invention, there are provided in the aforementioned diagnosis method a step of storing a value of the pressure signal corresponding to the atmospheric pressure as a first pressure value, a step of storing as a second pressure value a value of the pressure signal generated by the pressure sensor means and representing a pressure within the intake air passage or a pressure within the exhaust gas recirculation control valve, and a step of making decision as to whether or not a difference value between the first pressure value and the second pressure value is smaller than a predetermined value, wherein when the difference value is smaller than the predetermined value, the diagnosis of the exhaust gas recirculation control system is invalidated.

The diagnosis method described above is based on the fact that when difference between the first and second pressures applied to the pressure sensor by changing over the pressure sources therefor is smaller than a predetermined value, this indicates a high probability of the pressure sensor means being frozen and thus inoperative. Accordingly, the diagnosis execution step is invalidated for evading the erroneous decision.

According to a fifth aspect of the invention, there are provided in the aforementioned diagnosis method a step responsive to a key switch signal for storing pressure values successively after every turning-on of a key switch on a time-serial basis, and a step of deciding whether or not a change in the successive pressure values detected serially is smaller than a predetermined value representative of an error level, wherein when the change in the pressure value is smaller than the predetermined value, the fault diagnosis of the exhaust gas recirculation control system is invalidated.

With the diagnosis method described above, erroneous diagnosis of the exhaust gas recirculation system can be evaded.

Further according to the present invention, there is provided an apparatus for detecting or diagnosing whether or not the pressure sensor means suffers from abnormality such as freezing or the like. In this conjunction, it should be appreciated that the pressure sensor means is not limited to the application to the diagnosis of the exhaust gas recirculation control system but may find other applications.

Thus, the invention is also directed to an apparatus for diagnosing the pressure sensor means as to occurrence of abnormality thereof in an internal combustion engine equipped with an exhaust gas recirculation control system which includes an exhaust gas recirculation passage communicated to an exhaust gas passage and an intake air passage of the engine, an exhaust gas recirculation control valve disposed in the exhaust gas recirculation passage for controlling exhaust gas recirculation through the exhaust gas recirculation passage, and pressure sensor means adapted to detect pressure within at least one of the exhaust gas passage and the intake air passage.

According to another aspect of the invention, the apparatus comprises a means for making decision in response to a start switch signal generated for starting operation of the engine as to whether or not at least one of a cooling water temperature, an intake air temperature and an engine oil temperature of the engine upon starting thereof is lower than a predetermined lowest temperature at which the pressure sensor means can operate normally, and a means for deciding that the pressure sensor suffers from abnormality when the at least one of the temperatures mentioned above is not higher than the predetermined lowest temperature.

According to still another aspect of the invention, there is provided an apparatus for diagnosing the pressure sensor means as to occurrence of abnormality thereof, which apparatus comprises a means responsive to a key switch signal for storing as a first pressure value a value of a pressure signal generated by the pressure sensor means and indicating an atmospheric pressure immediately before a key switch was precedingly turned off, a means responsive to the key switch signal for storing as a second pressure value a value of a pressure signal generated by the pressure sensor means and indicating the atmospheric pressure immediately after the key switch was currently turned on, a means for deciding whether or not a pressure difference determined on the basis of a difference between the first pressure value and the second pressure value is greater than a predetermined value, and a means for making decision that the pressure sensor suffers from abnormality when the pressure difference is greater than the aforementioned predetermined value.

According to yet another aspect of the invention, there is provided an apparatus for diagnosing the pressure sensor means as to occurrence of abnormality thereof, which apparatus comprises a means for making decision as to whether or not the engine is in a transient operation state, a means for storing values of pressure signals generated by the pressure sensor means and indicative of pressures prevailing within one of the intake air passage and the exhaust gas recirculation control valve successively on a time-serial basis when the engine is decided as being in the transient state, a means for making decision as to whether or not change in the pressure values remains smaller for a predetermined period than a predetermined value representing a change in the transient operation of the engine, and a means for deciding that the pressure sensor means suffers from abnormality when the change in the pressure values remains smaller than the above-mentioned predetermined value.

According to a further aspect of the invention, there is provided an apparatus for diagnosing the pressure sensor means as to occurrence of abnormality thereof, which apparatus comprises a means for storing a value of the pressure signal corresponding to the atmospheric pressure as a first pressure value, a means for storing as a second pressure value a value of the pressure signal generated by the pressure sensor means and indicative of a pressure within the intake air passage or a pressure within the exhaust gas recirculation control valve, a means for making decision as to whether or not a difference value between the first pressure value and the second pressure value is smaller than a predetermined value, and a means for deciding that the pressure sensor means suffers from abnormality when the difference value is smaller than the predetermined value.

According to a still further aspect of the invention, there is provided an apparatus for diagnosing the pressure sensor means as to occurrence of abnormality thereof, which apparatus comprises a means responsive to a key switch signal for storing pressure values of pressure signals generated by the pressure sensor after every turning-on of a key switch successively on a time-serial basis, a means for deciding whether or not a change between the successive pressure values is smaller than a predetermined value representative of an error level, and a means for deciding that the pressure sensor means suffers from abnormality when the change in the pressure value is smaller than the predetermined value.

The above and other objects, features and attendant advantages of the present invention will more easily be understood by reading the following description of the preferred embodiments thereof taken, only by way of example, in conjunction with the drawings.

DESCRIPTION OF THE PREFERRED EMBODIMENTS

Now, the present invention will be described in detail in conjunction with preferred or exemplary embodiments thereof by reference to the drawings.

EMBODIMENT 1

Figure 1:
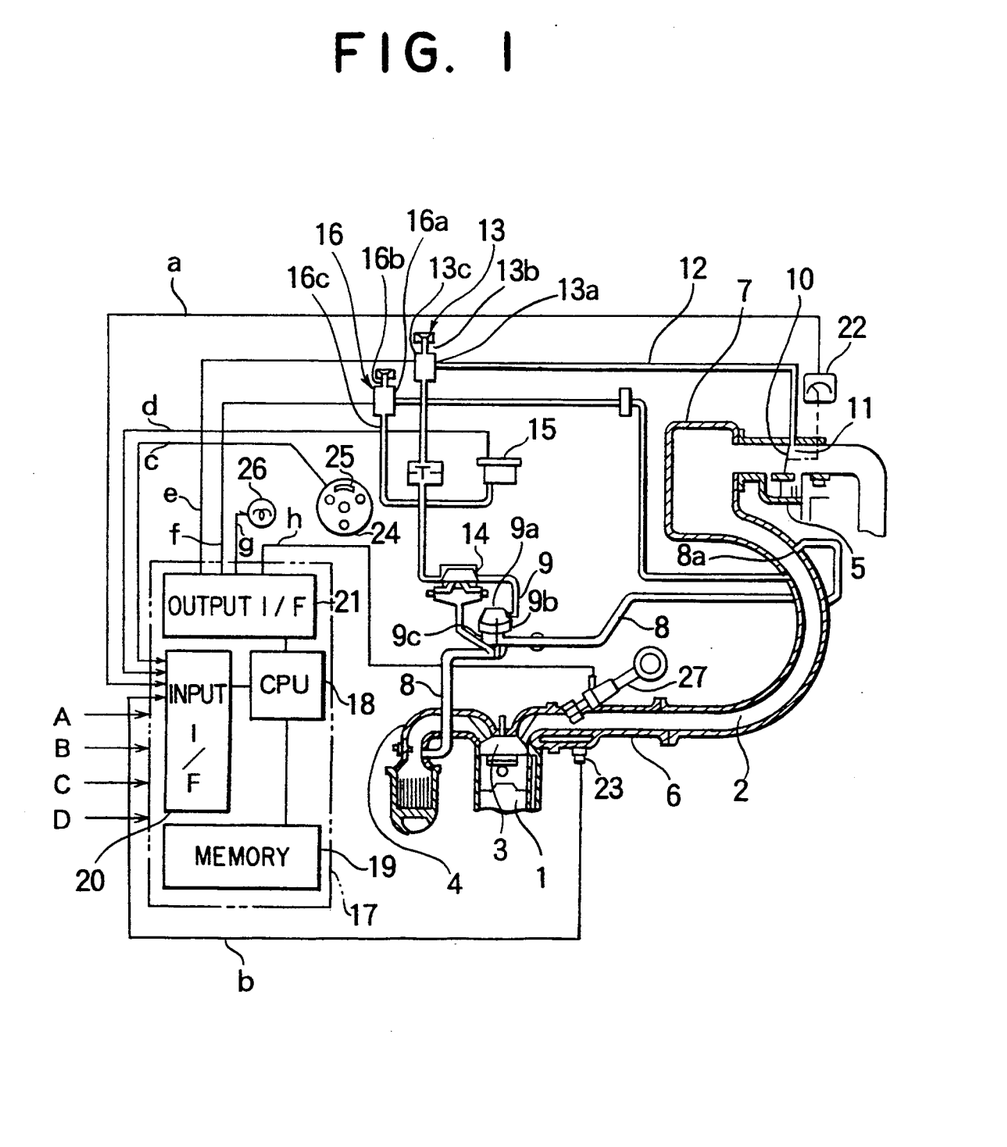
FIG. 1 shows schematically a general arrangement of an internal combustion engine system for a motor vehicle to which the present invention can be applied.

FIG. 1 shows schematically a general arrangement of an internal combustion engine system for a motor vehicle to which the invention is applied. Referring to the figure, an internal combustion engine 1 is equipped with an intake air passage 2 and an exhaust gas passage 4. The intake air passage 2 is communicated to combustion chambers 3 of the engine 1. Disposed between a throttle body 5 and an intake pipe 6 which constitute parts of the intake air passage 2 is a surge tank 7 for suppressing pulsation in the intake air flow. An exhaust gas recirculation passage (hereinafter also referred to as the EGR passage in abbreviation) 8 is branched from the intake air passage 2 at a position downstream of the surge tank 7 and communicated to the exhaust gas passage 4. Installed in the EGR passage 8 is an exhaust gas recirculation control valve (hereinafter also referred to as the EGR control valve) 9 which is adapted to operate in dependence on a difference between the atmospheric pressure and the suction pressure. A part of the exhaust gas flowing through the exhaust gas passage 4 is recirculated to the intake air passage 2 through the EGR valve 9 in dependence on the degree of opening thereof which in turn depends on the running conditions or states of the engine. The EGR control valve 9 thus constitutes a major part of the exhaust gas recirculation control system (hereinafter also referred to as the EGR system).

The EGR control valve 9 includes a negative-pressure chamber 9a which is communicated to an EGR port 11 provided in the vicinity of a throttle valve 10 by way of a negative-pressure passage 12 so that the suction pressure can be applied to the negative-pressure chamber 9a. Further, the EGR control valve 9 includes a constant-pressure chamber 9b communicated to the atmosphere and isolated from the negative-pressure chamber 9a by a diaphragm and a valve element 9c. When the difference in pressure between the negative-pressure chamber 9a and the constant-pressure chamber 9b exceeds an actuation pressure of the EGR control valve 9, (i.e., the pressure at which the EGR control valve 9 is actuated) the valve element 9c is moved toward the close position. In this manner, the exhaust gas flowing through the exhaust gas passage 4 is recirculated through the EGR system to the intake air passage 2 in dependence on the intake air flow.

On the other hand, there is installed in the negative-pressure passage 12 a negative-pressure change-over valve 13 which serves for controlling the actuation of the EGR control valve 9 in dependence on the engine load. The negative-pressure change-over valve 13 may be an electromagnetic three-way valve of vacuum switching type which is so constituted as to be selectively communicated to the atmosphere and the intake air passage 2. More specifically, the negative-pressure change-over valve 13 has a first inlet port 13a communicated to the EGR port 11, a second inlet port 13b opened to the atmosphere through a filter and an outlet port 13c communicated to the EGR valve 9. In the state where no electric power is applied to an electric input terminal of the negative-pressure change-over valve 13, the first inlet port 13a to which the suction pressure is applied is communicated to the outlet port 13c, resulting in that the valve 13 is set to the "open" state. On the other hand, when the electric power is applied to the input terminal of the valve 13, the second inlet port 13b exposed to the atmospheric pressure is communicated to the outlet port 13c. Thus, the negative-pressure change-over valve 13 assumes the "close" state.

Further, installed in the negative-pressure passage 12 between the electromagnetic change-over valve 13 and the EGR control valve 9 is an EGR modulator 14 which serves for adjusting the negative-pressure introduced into the negative-pressure chamber 9a of the EGR control valve 9 in dependence on the exhaust gas pressure prevailing within the EGR passage 8 upstream of the EGR control valve 9. The EGR modulator 14 may be constituted by a conventional one known in the art.

Extending from the intake air passage 2 at a position downstream of an exhaust gas inlet port 8a of the EGR passage 8 is a pipe to which a pressure sensor 15 is connected through an interposed filter (not shown). The pressure sensor 15 is adapted to be selectively exposed to the atmosphere pressure and the pressure within the intake air passage 2 at a location downstream of the surge tank 7 by way of an electromagnetic change-over valve 16. More specifically, the change-over valve 16 is constituted by an electromagnetic three-way valve similar to the electromagnetic negative-pressure change-over valve 13 and has a first inlet port 16a communicated to the intake air passage 2 at a location downstream of the surge tank 7, a second inlet port 16b opened to the atmosphere through a filter (not shown) and an outlet port 16c which is connected to the pressure sensor 15. In the state where no electric power is supplied to an electric input terminal of the electromagnetic change-over valve 16, the second inlet port 16b exposed to the atmospheric pressure is communicated to the outlet port 16c, while upon application of the electric power to the input terminal of this valve 16, the inlet port 16a receiving the suction pressure from the intake air passage 8 is communicated to the output port 16c of the valve 16.

As a system for controlling the engine operation, a microcomputer-based control system 17 is provided. This control system 17 receives signals delivered from a variety of sensors installed for detecting various running states or conditions of the engine as mentioned below, and performs various controls such as fuel injection control, ignition timing control and so forth. To this end, the control system 17 includes a central processing unit or CPU 18, a memory 19 provided in association with the CPU 18, an input interface 20 and an output interface 21.

As the input signals supplied to the control system 17 through the input interface 20, there may be mentioned at least a load signal a delivered from a throttle opening sensor 22, a water temperature signal b from a water temperature sensor 23, an engine speed (rpm) signal c from a crank angle sensor 25 provided in combination with a distributor 24 and a pressure signal d from the pressure sensor 15. In the case of the illustrated embodiment of the invention, the input interface 20 is additionally supplied as input signals a starter switch signal A indicating the engine starting state, an intake air temperature signal B from an intake air temperature sensor adapted to detect the ambient temperature, an oil temperature signal C from an oil temperature sensor adapted to detect the temperature of engine oil, and a key switch signal D indicating ON/OFF operation of a key switch. Parenthetically, the sensors as employed for generating the signals mentioned above are omitted from illustration. At this juncture, it should be mentioned that the starter switch for generating the starter switch signal A is constituted by an on/off switch for detecting whether or not electric power is supplied to a starter in the engine starting state.

As output signals from the microcomputer-based control system 17 through the output interface 21, there may be mentioned a control signal e for the electromagnetic negative-pressure change-over valve (three-way valve) 13, a control signal f for the electromagnetic change-over valve 16, an indication signal g for a diagnosis lamp 26 which serves for displaying the result of diagnosis performed for the EGR system, and a control signal h for a fuel injection valve 27 installed in the intake pipe 6 in the vicinity of the engine body.

Next, an EGR control system diagnosing method according to the first embodiment of the invention will be described by reference to a flow chart shown in FIG. 2.

Figure 2:
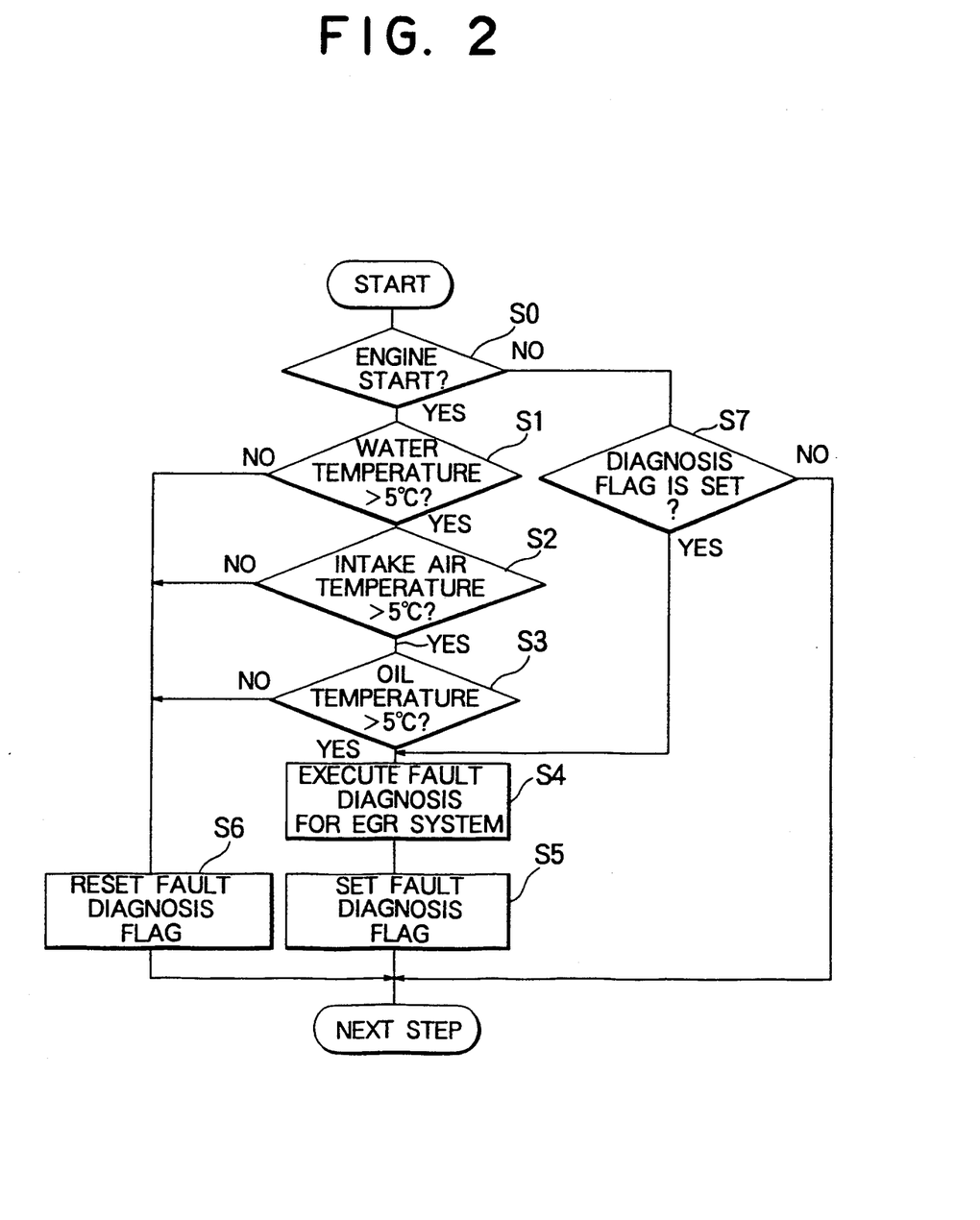
FIG. 2 is a flow chart for illustrating a method of diagnosing an exhaust gas recirculation control system (EGR) system of an engine according to a first embodiment of the invention.

A fault diagnosis routine or processing illustrated in FIG. 2 is executed by the CPU 18 incorporated in the microcomputer-based control system 17 and stored previously in the memory 19 as a program.

At first, in a step S0, it is decided on the basis of the aforementioned starter switch signal A whether or not the engine is being started. If so (YES), then in a step S1, decision is made on the basis of the water temperature signal b supplied from the water temperature sensor 23 as to whether the temperature of the engine cooling water is higher than a predetermined value (e.g., 5° C.).

When the decision in the step S1 results in that the water temperature is higher than 5° C., the processing proceeds to a step S2 where it is decided on the basis of the intake air temperature signal B supplied from the intake air temperature sensor whether the temperature of the intake air is higher than a predetermined value (e.g., 5° C.). When the result of the decision step S2 is affirmative (YES), then a succeeding step S3 is executed to decide on the basis of the oil temperature signal C supplied from the oil temperature sensor whether or not the temperature of the engine oil is higher than a predetermined value (e.g., 5° C.). When the decision step S3 results in that the oil temperature is higher than 5° C., it is then determined that the pressure sensor 15 is in the normal state, and the diagnosis of the EGR system as to occurrence of abnormality or fault therein is executed (step S4). At this juncture, it should be noted that the reference temperatures adopted as the predetermined values (e.g., 5° C.) in the steps S1 to S3 are selected to correspond to a lower limit temperature at which the pressure sensor system including the pressure sensor 15 can operate normally without suffering from abnormality such as freezing of moisture as mentioned previously.

In the fault diagnosis steps S4, the diagnosis of the EGR system is performed on the basis of change in the pressure signal d supplied from the pressure sensor 15. Of course, other diagnoses such as engine abnormality diagnosis and other may be performed on the basis of the various signals a to d and A to D supplied from the corresponding sensors mentioned above. More specifically, in the fault diagnosis step S4, the EGR control valve 9 is temporarily opened and closed during the operation of the engine, and change in the suction pressure before and after the opening/closing of the EGR control valve 9 is detected, whereon decision is made whether or not the change in the suction pressure lies within a predetermined range. When the change in the suction pressure is outside of the predetermined range, it is decided that a fault occurs in the EGR system. A processing for effecting this fault diagnosis is disclosed, for example, in Unexamined Japanese Patent Application Publication No. 9937/1991 (JP-A-H2-9937), which is incorporated herein in its entirety by reference.

Upon completion of execution of the fault diagnosis step S4, the result of the diagnosis is displayed by the diagnosis lamp 26, and a fault diagnosis execution flag is set to "1" (step S5), whereon the processing proceeds to a next step (a main routine or a return step).

On the other hand, when at least one of the water temperature, the intake air temperature and the engine oil temperature is decided to be lower than the predetermined value (5° C.) in the step S1, S2 and/or S3, this means that there exists a possibility of the pressure sensor system being frozen. In this case, the fault diagnosis execution steps S4 and S5 are skipped with the fault diagnosis execution flag being reset (step S6), whereon the processing proceeds to the next step.

Further, when decision is made in the step S0 that the engine is not in the starting state (but in a steady running state, for example), it is then decided whether or not the fault diagnosis execution flag has already been set in a step S7. When the answer of this decision step S7 is affirmative (YES), it is then determined that the temperatures of concern were normal at the time point of the engine starting and that the pressure sensor system operates normally. Accordingly, the processing proceeds to the step S4 where the fault diagnosis is executed.

On the other hand, when the fault diagnosis execution flag is reset to "0", this indicates the possibility of the pressure sensor system being frozen due to low temperature in the engine starting operation. Accordingly, the processing proceeds to the next step by skipping the fault diagnosis execution steps S4 and S5. In this way, the fault diagnosis of the exhaust gas recirculation system is not executed regardless of the engine running states, when there exists the possibility of the pressure sensor system (15) being frozen. Thus, erroneous diagnosis due to abnormality or freezing of the pressure sensor system (15) can positively be prevented, whereby inconveniences such as erroneous generation of an abnormality alarm which will discomfort the driver, unnecessary exchange of normal parts and so forth can be avoided.

EMBODIMENT 2

In the case of the first embodiment of the invention, the possibility of the pressure sensor being frozen (i.e., whether the fault diagnosis of the exhaust gas recirculation system is to be inhibited or not, to say in another way) is decided on the basis of the temperatures prevailing at the time of engine starting operation. In contrast, according to the teachings of the invention incarnated in the second embodiment, it is proposed that the permissibility of the fault diagnosis is decided on the basis of a difference or deviation between the pressure signal d detected immediately before the key switch was turned off in precedence and the pressure signal d detected immediately after the key switch was turned on currently.

Figure 3:
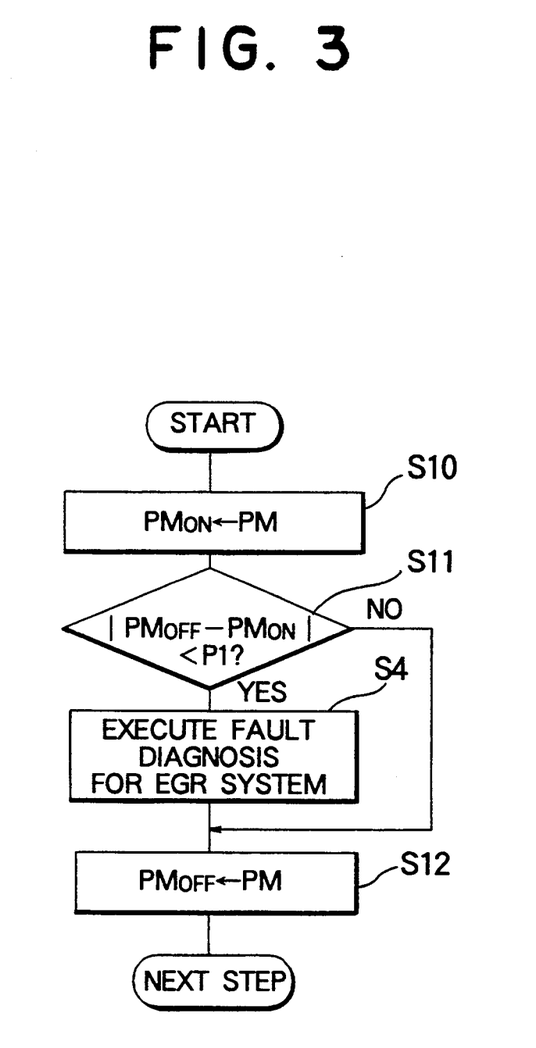
FIG. 3 is a flow chart for illustrating a EGR system diagnosis method according to a second embodiment of the invention.

FIG. 3 is a flow chart illustrating the processing according to the second embodiment of the invention.

The fault diagnosis for the exhaust gas recirculation system is executed at the step S4 as in the case of the first embodiment. Further, the exhaust gas recirculation system to which the instant embodiment is applied is implemented in the structure shown in FIG. 1.

In response to the key switch signal D, a value $PM_{ON}$ of the pressure signal d outputted from the pressure sensor 15 immediately after the key switch was turned on is stored at an address PMON in the memory 19 in a step S10.

At this time point, no electric power is supplied to the input terminal of the electromagnetic change-over valve (three-way valve) 16 which is in the initial state, and thus the change-over valve 16 remains "open". Consequently, the atmospheric pressure is applied to the pressure sensor 15. Thus, the pressure value $PM_{ON}$ detected immediately after the current turn-on of the key switch indicates the atmospheric pressure. In this conjunction, it is assumed that a value $PM_{OFF}$ of the pressure signal d indicating the atmospheric pressure immediately before the preceding turn-off of the key switch has already been stored in the memory 19.

Now, in a step S11, an absolute value of difference or deviation between the atmospheric pressure $PM_{OFF}$ detected immediately before the preceding turn-off of the key switch and the atmospheric pressure $PM_{ON}$ detected immediately after the current turn-on of the key switch, i.e., $|PM_{OFF}-PM_{ON}|$ is determined and compared with a predetermined value P1, to thereby determine whether the pressure difference is lower than the predetermined value P1 (e.g., 75 mmHg). Parenthetically, the predetermined value P1 may be selected by taking into account a tolerable error level.

In case the result of the decision step S11 is affirmative or YES (i.e., $|PM_{OFF}-PM_{ON}|<P1$), then the fault diagnosis of the exhaust gas recirculation system is carried out in a step S4. More specifically, an electric power is applied to the input terminal of the electromagnetic change-over valve 16 to close it for thereby allowing the suction air pressure within the intake passage 2 to be applied to the pressure sensor 15, and the fault diagnosis is executed when the pressure signal d derived from the output of the pressure sensor 15 satisfies the conditions for the fault diagnosis.

At the end of the fault diagnosis step S4, the pressure value PM detected immediately before the current turn-off of the key switch is stored in the memory 19 as the updated pressure value $PM_{OFF}$ (step S12), whereon the processing proceeds to the next step.

On the other hand, when it is decided in the step S11 that the absolute value of the pressure difference $|PM_{OFF}-PM_{ON}|$ is not lower than the predetermined value P1, the processing jumps to the step S12 by skipping the fault diagnosis execution step S4. This is because there is a high probability that the value PM of the pressure signal d is significantly deviated from the normal value thereof when freezing takes place in the pressure sensor system, and thus a large pressure difference between the pressures $PM_{OFF}$ and $PM_{ON}$ may erroneously indicate occurrence of the freezing.

As is apparent from the above description, the erroneous diagnosis due to the freezing in the pressure sensor system can equally be prevented according to the instant embodiment as in the case of the first embodiment.

In the foregoing description of the second embodiment of the invention, the electromagnetic change-over valve 16 is opened for determining on the basis of the atmospheric pressure the pressure difference which serves as the reference for the decision-making as to occurrence of freezing in the pressure sensor. At this juncture, it should be mentioned that the pressure difference of concern may be determined on the basis of the suction pressure within the intake passage 2 in the idling state of the engine as well.

EMBODIMENT 3

In the case of the second embodiment, the probability of occurrence of the freezing of the pressure sensor system is decided on the basis of the difference between the pressure values (atmospheric pressures) stored in the memory in response to the turn-on/off of the key switch. According to the invention incarnated in the third embodiment now under consideration, it is taught to make the decision on the basis of a difference in the pressure value (suction pressure value) making appearance across a change in the running state of the engine.

Figure 4:
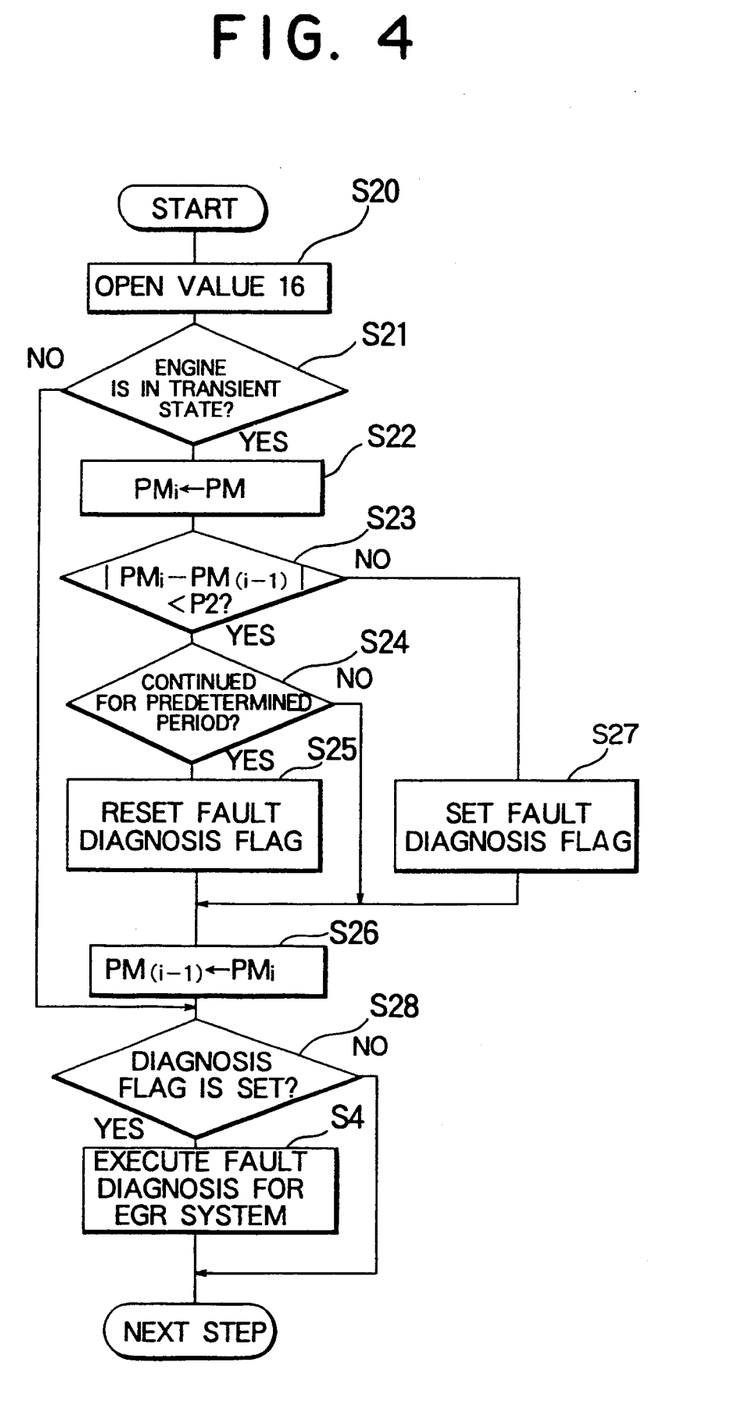
FIG. 4 is a flow chart for illustrating an EGR system diagnosis method according to a third embodiment of the invention.

FIG. 4 is a flow chart for illustrating the fault diagnosis processing according to the instant embodiment of the invention. In this flow chart, the step S4 represents the EGR fault diagnosis step as in the case of the first and second embodiments. Further, the exhaust gas recirculation system to which the third embodiment of the invention is applied is implemented in the arrangement shown in FIG. 1.

Now, referring to FIG. 4, in a step S20, an electric power is applied to the input terminal of the electromagnetic change-over valve 16 to thereby close it so that the suction pressure within the intake passage 2 is introduced to the pressure sensor 15. Subsequently, in a step S21, decision as to whether the engine is in the transient state or not is made on the basis of the load signal a derived from the output of the throttle opening sensor 22 and the engine speed (rpm) signal c derived from the crank angle sensor 25. When the transient state of the engine is determined, the value PM which the suction pressure signal d indicates is stored in the memory 19 as $PM_i$ in a step S22. It is assumed that there has already been stored in the memory 19 a suction pressure value $PM_{(i-1)}$ fetched in precedence In a step S23, the suction pressure value $PM_{(i-1)}$ stored previously is read out from the memory 19 and an absolute value of pressure difference $|PM_i-PM_{(i-1)}|$ between the preceding suction pressure $PM_{(i-1)}$ and the current suction pressure $PM_1$ is determined and compared with a predetermined value P2 (e.g., 10 mmHg) to thereby decide whether or not the absolute suction pressure difference is smaller than the predetermined value P2. In this conjunction, the predetermined value P2 is selected so as to correspond to a change occurring in the transient running state of the engine (e.g., change in the suction pressure).

When the result of the decision step S23 is affirmative (YES), i.e., when $|PM_i-PM_{(i-1)}|<P2$, it is then decided in a step S24 whether or not this state has continued for a predetermined period. If so, the fault diagnosis execution flag is reset to zero in a step S25 and the current pressure value $PM_i$ is stored as an updated preceding pressure value $PM_{(i-1)}$ in a step S26 to be used in the similar decision subsequently. To this end, the memory 19 may be implemented as a first-in/first-out (FIFO) memory so that the pressure values $PM_i$ and $PM_{(i-1)}$ as stored in the memory are constantly updated.

On the other hand, when it is determined in the step S23 that the absolute pressure difference $|PM_i-P-$ $M_{(i-1)}|$ is not smaller than the predetermined value P2, the processing proceeds to a step S26 by skipping the steps S24 and S25 while setting the fault diagnosis execution flag to "1" in a step S27.

Further, when it is determined in the step S24 that the transient state of concern has not continued for the predetermined period, the step S25 is skipped, and the processing proceeds to the step S26 without resetting the fault diagnosis execution flag.

Subsequently, in a step S28, decision is made as to whether the fault diagnosis flag is set or not. If the flag is set, the processing proceeds to the fault diagnosis execution step S4. On the other hand, when the flag is reset, the fault diagnosis execution step S4 is skipped, and the processing proceeds to the succeeding step.

By way of example, when the absolute pressure difference value $|PM_i - PM_{(i-1)}|$ is greater than the predetermined value P2 and when the fault diagnosis execution flag is set, it is determined that the pressure sensor system is normal, whereon the fault diagnosis is executed normally (step S4). Further, when the state in which the absolute pressure difference value $|PM_i - PM_{(i-1)}|$ is smaller than the predetermined value P2 has continued for a predetermined period and when it is found in the step S25 that the fault diagnosis execution flag is reset, the processing proceeds to the next step by skipping the fault diagnosis execution step S4. This is because there is a high probability that the freezing takes place in the pressure sensor system, when the suction pressure remains unchanged while the pressure difference continues to be smaller than the predetermined value P2, since the suction pressure (or exhaust gas recirculation pressure) within the intake passage 2 will have to change in response to a change of the transient running state of the engine.

As can be appreciated from the foregoing description, erroneous diagnosis due to the freezing of the pressure sensor system can positively be prevented, as in the case of the first and second embodiments.

EMBODIMENT 4

In the case of the third embodiment of the invention, probability of the pressure sensor system being frozen is determined on the basis of the change in the suction pressure which occurs in the transient operation state of the engine. Such determination or decision may also be performed on the basis of a change in the pressure signal d which makes appearance when the pressure applied to the pressure sensor 15 is changed over through the electromagnetic valve 16, because the pressure signal d will remain constant independent of the change in the pressure applied to the pressure sensor 15 when the pressure sensor system is frozen.

Figure 5:
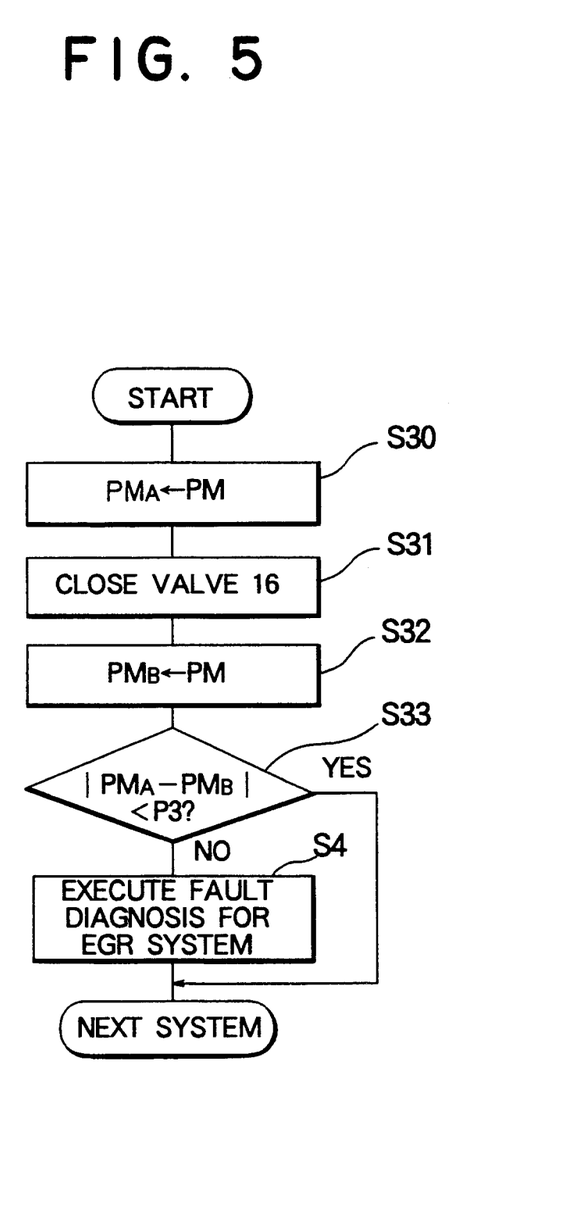
FIG. 5 is a flow chart for illustrating an EGR system diagnosis method according to a fourth embodiment of the invention.

FIG. 5 is a flow chart for illustrating the EGR fault diagnosis method according to the fourth embodiment of the invention, wherein the intrinsic fault diagnosis is performed in the step S4 as in the case of the preceding embodiments. Further, the EGR system to which the instant embodiment is applied may be implemented in the arrangement shown in FIG. 1.

Referring to FIG. 5, in a step S30, a value PM of the pressure signal d is fetched in the state where no electric power is supplied to the input terminal of the change-over valve 16 (which is thus in the open state) and stored in the memory 19 as a value $PM_A$. In this case, the pressure sensor 15 is subjected to the pressure from the second input port 16b exposed to the atmosphere. Accordingly, the above-mentioned pressure value $PM_A$ indicates the atmospheric pressure.

Subsequently, in a step S31, the electromagnetic change-over valve (three-way valve) 16 is electrically energized so that the valve 16 is closed. At this time, the suction pressure within the intake air passage 2 is applied to the pressure sensor 15 through the first inlet port 16a. In this state, the value PM of the pressure signal d is stored in the memory 19 as a value $PM_B$ (suction pressure) in a step S32. Subsequently, an absolute value of difference between the suction pressure $PM_B$ and the atmospheric pressure $PM_A$ stored previously in the memory 19, i.e., $|PM_A - PM_B|$ is determined and compared with a predetermined value P3 (e.g., 20 mmHg) to thereby determine whether the absolute difference value is smaller than the predetermined value P3 (step S33). In case the pressure difference is not smaller than the predetermined value P3, it is determined that the pressure sensor 15 operates normally. Consequently, the processing proceeds to the step S4 where the fault diagnosis is executed for the EGR system.

On the other hand, when the pressure difference of concern is smaller than the predetermined value P3 (i.e., when the step S33 results in "YES"), there is a high probability of the pressure sensor system inclusive of the pressure sensor 15 being frozen. Accordingly, the processing jump to the step which follows the EGR system fault diagnosis step S4 by skipping the latter.

Through the procedure described above, erroneous diagnosis of the EGR system can be avoided as in the case of the embodiments 1 to 3.

EMBODIMENT 5

In the case of the fourth embodiment described above, the possibility of the pressure sensor system being frozen is decided on the basis of the change in the pressure value PM making appearance before and after operation of the change-over valve 16. In contrast, according to the teachings of the invention incarnated in the fifth embodiment, it is proposed that the permissibility of the fault diagnosis is decided on the basis of a change in the pressure value PM after the turn-on of the key switch (deviation from the pressure value detected after the preceding turn-on of the key switch).

Figure 6:
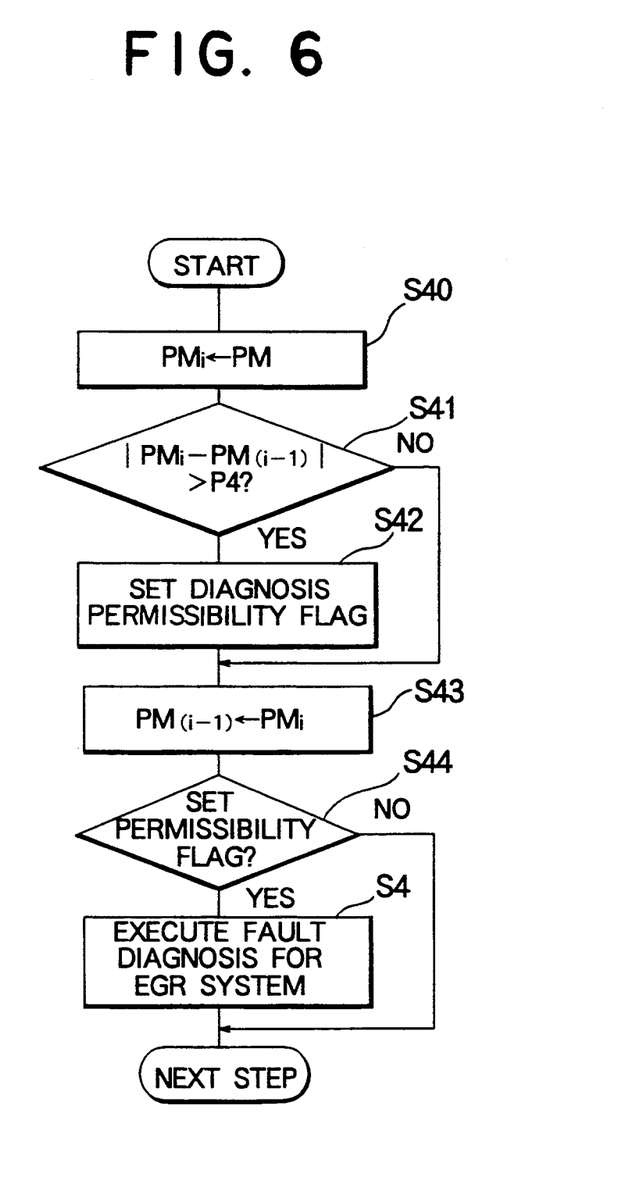
FIG. 6 is a flow chart for illustrating an EGR system diagnosis method according to a fifth embodiment of the invention.

FIG. 6 is a flow chart illustrating the EGR fault diagnosis processing according to the fifth embodiment of the invention. The fault diagnosis for the exhaust gas recirculation system is executed at the step S4 as in the case of the preceding embodiments. Further, the exhaust gas recirculation system to which the instant embodiment is applied may be implemented in the arrangement shown in FIG. 1.

In response to the key switch signal D, a value $PM_i$ of the pressure signal d detected by the pressure sensor 15 simultaneously with the closing of the key switch is stored in the memory 19 in a step S4. At this time point, the pressure value detected upon preceding turn-on of the key switch has already been stored in the memory 19 as a value $PM_{(i-1)}$.

Subsequently, in a step S41, the preceding pressure value $PM_{(i-1)}$ is read out from the memory 19 to determine an absolute difference value between the current pressure values $PM_i$ and the preceding one $PM_{(i-1)}$, i.e., $|PM_i - PM_{(i-1)}|$. The difference value as determined is then compared with a predetermined value P4 (e.g., 7 mmHg) to thereby determine whether the pressure difference is greater than the predetermined value P4

(step S41). Parenthetically, the predetermined value P4 may be set to an error level which lies just outside of excursion range of analogue-to-digital (A/D) converter incorporated in the input interface 20.

When the decision in the step S41 results in "YES" (i.e., when $|PM_i-PM_{(i-1)}| > P4$), it is determined that the pressure sensor system operates normally. Accordingly, the fault diagnosis flag is set to "1" (step S42), whereon the current pressure value $PM_i$ is stored as an updated preceding pressure value $PM_{(i-1)}$ (step S43). In this way, the preceding pressure value $PM_{(i-1)}$ is constantly updated to be utilized for the decision next time.

On the other hand, when the decision step S41 results in "NO" (i.e., when $|PM_I-PM_{(i-1)}| \leq P4$), the step S42 is skipped without setting the fault diagnosis flag. The processing then proceeds to the step S43.

Next, in a step S44, decision is made as to whether the fault diagnosis flag is set. Otherwise, the fault diagnosis execution step S4 is skipped, and the processing proceeds to the succeeding step.

As is apparent from the above description, when $|PM_i-PM_{(i-1)}| > P4$ and when the fault diagnosis flag is set in the step S42, it is determined that the pressure sensor system is normal to thereby effect the fault diagnosis execution step S4. On the other hand, when $|PM_i-PM_{(i-1)}| \leq P4$ and when the fault diagnosis flag is reset, it is determined that freezing occurs in the pressure sensor system. Accordingly, the fault diagnosis execution step S4 is not carried out.

In this manner, the erroneous diagnosis due to occurrence of freezing in the pressure sensor system can positively be prevented.

EMBODIMENT 6

In the case of the first to fifth embodiments described above, the first inlet port 16a of the change-over valve 16 is connected to the intake air passage 2 so that the suction pressure is applied to the pressure sensor 15. However, substantially same effects can be obtained even when the first inlet port 16a of the valve 16 is connected to the EGR passage 8 to thereby apply the pressure within the intake air passage 8 to the pressure sensor 15 according to the sixth embodiment of the invention. In this case, the value PM of the pressure signal d generated by the pressure sensor 15 indicates the pressure prevailing within the EGR passage when the change-over valve 16 is "closed" in the same sense as in the third and fourth embodiments. However, it goes without saying that the intended object of the invention can equally be accomplished.

Many features and advantages of the present invention are apparent form the detailed specification and thus it is intended by the appended claims to cover all such features and advantages of the system which fall within the true spirit and scope of the invention. Further, since numerous modifications and combinations will readily occur to those skilled in the art, it is not intended to limit the invention to the exact construction and operation illustrated and described. By way of example, although it has been assumed that the fault diagnosis execution step S4 is invalidated when the frozen state of the pressure sensor system is determined, it is possible to execute the fault diagnosis step S4 and to invalidate the result of the diagnosis to the substantially same effect. Accordingly, all suitable modifications and equivalents may be resorted to, falling within the spirit and scope of the invention.

I claim:

1. In an internal combustion engine equipped with an exhaust gas recirculation control system which includes an exhaust gas recirculation passage communicated to an exhaust gas passage and an intake air passage of said engine and an exhaust gas recirculation control valve disposed in said exhaust gas recirculation passage for selectively closing and opening said exhaust gas recirculation passage, a method of diagnosing said exhaust gas recirculation control system as to occurrence of a fault, wherein said exhaust gas recirculation control valve is temporarily manipulated during operation of said engine to thereby detect by pressure sensor means incorporated in said exhaust gas recirculation control system whether or not a change in pressure within one of said intake air passage and said exhaust gas passage brought about by said temporary manipulation of said exhaust gas recirculation control valve lies within a predetermined range, and a diagnosis is performed for said exhaust gas recirculation control system as to occurrence of a fault in said system on the basis of a result of said detection, said method comprising:

a step of making decision in response to a start switch signal generated for starting operation of said engine as to whether or not at least one of a cooling water temperature, an intake air temperature and an engine oil temperature of said engine upon starting thereof is lower than a predetermined lowest temperature at which said pressure sensor means can operate normally; and a step of invalidating said fault diagnosis of said exhaust gas recirculation control system when said at least one temperature is not higher than said predetermined lowest temperature.

2. In an internal combustion engine equipped with an exhaust gas recirculation control system which includes an exhaust gas recirculation passage communicated to an exhaust gas passage and an intake air passage of said engine and an exhaust gas recirculation control valve disposed in said exhaust gas recirculation passage for selectively closing and opening said exhaust gas recirculation passage, a method of diagnosing said exhaust gas recirculation control system as to occurrence of a fault, wherein said exhaust gas recirculation control valve is temporarily manipulated during operation of said engine to thereby detect by pressure sensor means incorporated in said exhaust gas recirculation control system whether or not a change in pressure within one of said intake air passage and said exhaust gas passage brought about by said temporary manipulation of said exhaust gas recirculation control valve lies within a predetermined range, and a diagnosis is performed for said exhaust gas recirculation control system as to occurrence of a fault in said system on the basis of a result of said detection, said method comprising:

a step responsive to a key switch signal for storing as a first pressure value a value of a pressure signal generated by said pressure sensor means and indicating an atmospheric pressure immediately before a key switch was precedingly turned off;

a step responsive to the key switch signal for storing as a second pressure value a value of a pressure signal generated by said pressure sensor means and indicating the atmospheric pressure immediately after said key switch was currently turned on; and a step of deciding whether or not a pressure difference determined on the basis of a difference between said first pressure value and said second pressure value is greater than a predetermined value which is so selected as to correspond to an error level which leads to erroneous fault diagnosis decision;

wherein when said pressure difference is greater than said predetermined value, said fault diagnosis of said exhaust gas recirculation control system is invalidated.

3. In an internal combustion engine equipped with an exhaust gas recirculation control system which includes an exhaust gas recirculation passage communicated to an exhaust gas passage and an intake air passage of said engine and an exhaust gas recirculation control valve disposed in said exhaust gas recirculation passage for selectively closing and opening said exhaust gas recirculation passage, a method of diagnosing said exhaust gas recirculation control system as to occurrence of a fault, wherein said exhaust gas recirculation control valve is temporarily manipulated during operation of said engine to thereby detect by pressure sensor means incorporated in said exhaust gas recirculation control system whether or not a change in pressure within one of said intake air passage and said exhaust gas passage brought about by said temporary manipulation of said exhaust gas recirculation control valve lies within a predetermined range, and a diagnosis is performed for said exhaust gas recirculation control system as to occurrence of a fault in said system on the basis of a result of said detection, said method comprising:

a step of making decision as to whether or not said engine is in a transient operation state;

a step of storing values of pressure signals indicative of pressures prevailing within one of said intake air passage and said exhaust gas recirculation control valve successively on a time-serial basis when said decision results in that said engine is in the transient state; and a step of making decision as to whether or not change in said pressure values remains smaller than a predetermined value representing a change in the transient operation of said engine for a predetermined period;

wherein when the change in said pressure values remains smaller than said predetermined value, said fault diagnosis of said exhaust gas recirculation control system in invalidated.

4. In an internal combustion engine equipped with an exhaust gas recirculation control system which includes an exhaust gas recirculation passage communicated to an exhaust gas passage and an intake air passage of said engine, an exhaust gas recirculation control valve disposed in said exhaust gas recirculation passage for selectively closing and opening said exhaust gas recirculation passage, and a change-over valve for selecting either a pressure within said intake air passage or alternatively within said exhaust gas recirculation control valve for executing a fault diagnosis of said exhaust gas recirculation control system while selecting an atmospheric pressure when said fault diagnosis is not executed, a method of diagnosing said exhaust gas recirculation control system as to occurrence of a fault, wherein said exhaust gas recirculation control valve is temporarily manipulated during operation of said engine to thereby detect by pressure sensor means incorporated in said exhaust gas recirculation control system and adapted to receive the pressure selected by said change-over valve whether or not a change in pressure within one of said intake air passage and said exhaust gas passage brought about by said temporary manipulation of said exhaust gas recirculation control valve lies within a predetermined range, and a diagnosis is performed for said exhaust gas recirculation control system as to occurrence of a fault in said system on the basis of a result of said detection, said method comprising:

a step of storing a value of the pressure signal corresponding to the atmospheric pressure as a first pressure value;

a step of storing as a second pressure value a value of the pressure signal generated by said pressure sensor means and indicative of a pressure within said intake air passage or a pressure within said exhaust gas recirculation control valve; and a step of making decision as to whether or not a difference value between said first pressure value and said second pressure value is smaller than a predetermined value;

wherein when said difference value is smaller than said predetermined value, said fault diagnosis of said exhaust gas recirculation control system is invalidated.

5. In an internal combustion engine equipped with an exhaust gas recirculation control system which includes an exhaust gas recirculation passage communicated to an exhaust gas passage and an intake air passage of said engine and an exhaust gas recirculation control valve disposed in said exhaust gas recirculation passage for selectively closing and opening said exhaust gas recirculation passage, a method of diagnosing said exhaust gas recirculation control system as to occurrence of a fault, wherein said exhaust gas recirculation control valve is temporarily manipulated during operation of said engine to thereby detect by pressure sensor means incorporated in said exhaust gas recirculation control system whether or not a change in pressure within one of said intake air passage and said exhaust gas passage brought about by said temporary manipulation of said exhaust gas recirculation control valve lies within a predetermined range, and a diagnosis is performed for said exhaust gas recirculation control system as to occurrence of a fault in said system on the basis of a result of said detection, said method comprising:

a step responsive to a key switch signal for storing pressure values of pressure signals generated by said pressure sensor after every turning-on of a key switch successively on a time-serial basis; and a step of deciding whether or not a change between said successive pressure values is smaller than a predetermined value representative of an error level;

wherein when said change in the pressure value is smaller than said predetermined value, said fault diagnosis of said exhaust gas recirculation control system is invalidated.

6. A diagnosis method according to claim 5, wherein said pressure signal indicates pressure within said intake air passage.

7. A diagnosis method according to claim 5, wherein said pressure signal indicates pressure within said exhaust gas recirculation system.

8. In an internal combustion engine equipped with an exhaust gas recirculation control system which includes an exhaust gas recirculation passage communicated to an exhaust gas passage and an intake air passage of said engine, an exhaust gas recirculation control valve disposed in said exhaust gas recirculation passage for controlling exhaust gas recirculation through said exhaust gas recirculation passage, and pressure sensor means adapted to detect pressure within at least one of said exhaust gas passage and said intake air passage, an apparatus for diagnosing said pressure sensor means as to occurrence of abnormality thereof, comprising:

means for making decision in response to a start switch signal generated for starting operation of said engine as to whether or not at least one of a cooling water temperature, an intake air temperature and an engine oil temperature of said engine upon starting thereof is lower than a predetermined lowest temperature at which said pressure sensor means can operate normally; and means for deciding that said pressure sensor suffers from abnormality when said at least one temperature is not higher than said predetermined lowest temperature.

9. In an internal combustion engine equipped with an exhaust gas recirculation control system which includes an exhaust gas recirculation passage communicated to an exhaust gas passage and an intake air passage of said engine, an exhaust gas recirculation control valve disposed in said exhaust gas recirculation passage for controlling exhaust gas recirculation through said exhaust gas recirculation passage, and pressure sensor means adapted to detect pressure within at least one of said exhaust gas passage and said intake air passage, an apparatus for diagnosing said pressure sensor means as to occurrence of abnormality thereof, comprising:

means responsive to a key switch signal for storing as a first pressure value a value of a pressure signal generated by said pressure sensor means and indicating an atmospheric pressure immediately before a key switch was precedingly turned off;

means responsive to the key switch signal for storing as a second pressure value a value of a pressure signal generated by said pressure sensor means and indicating the atmospheric pressure immediately after said key switch was currently turned on;

means for deciding whether or not a pressure difference determined on the basis of a difference between said first pressure value and said second pressure value is greater than a predetermined value; and means for making decision that said pressure sensor suffers from abnormality when said pressure difference is greater than said predetermined value.

10. In an internal combustion engine equipped with an exhaust gas recirculation control system which includes an exhaust gas recirculation passage communicated to an exhaust gas passage and an intake air passage of said engine, an exhaust gas recirculation control valve disposed in said exhaust gas recirculation passage for controlling exhaust gas recirculation through said exhaust gas recirculation passage, and pressure sensor means adapted to detect pressure within at least one of said exhaust gas passage and said intake air passage, an apparatus for diagnosing said pressure sensor means as to occurrence of abnormality thereof, comprising:

means for making decision as to whether or not said engine is in a transient operation state;

means for storing values of pressure signals generated by said pressure sensor means and indicative of pressures prevailing within one of said intake air passage and said exhaust gas recirculation control valve successively on a time-serial basis when said engine is decided as being in the transient state;

means for making decision as to whether or not change in said pressure values remains smaller for a predetermined period than a predetermined value representing a change in the transient operation of said engine; and means for deciding that said pressure sensor means suffers from abnormality when the change in said pressure values remains smaller than said predetermined value.

11. In an internal combustion engine equipped with an exhaust gas recirculation control system which includes an exhaust gas recirculation passage communicated to an exhaust gas passage and an intake air passage of said engine, an exhaust gas recirculation control valve disposed in said exhaust gas recirculation passage for controlling exhaust gas recirculation through said exhaust gas recirculation passage, and pressure sensor means adapted to detect pressure within at least one of said exhaust gas passage and said intake air passage, an apparatus for diagnosing said pressure sensor means as to occurrence of abnormality thereof, comprising:

means for storing a value of the pressure signal corresponding to the atmospheric pressure as a first pressure value;

means for storing as a second pressure value a value of the pressure signal generated by said pressure sensor means and indicative of a pressure within said intake air passage or a pressure within said exhaust gas recirculation control valve;

means for making decision as to whether or not a difference value between said first pressure value and said second pressure value is smaller than a predetermined value; and means for deciding that said pressure sensor means suffers from abnormality when said difference value is smaller than said predetermined value.

12. In an internal combustion engine equipped with an exhaust gas recirculation control system which includes an exhaust gas recirculation passage communicated to an exhaust gas passage and an intake air passage of said engine, an exhaust gas recirculation control valve disposed in said exhaust gas recirculation passage for controlling exhaust gas recirculation through said exhaust gas recirculation passage, and pressure sensor means adapted to detect pressure within at least one of said exhaust gas passage and said intake air passage,     an apparatus for diagnosing said pressure sensor means as to occurrence of abnormality thereof, comprising:

means responsive to a key switch signal for storing pressure values of pressure signals generated by said pressure sensor after every turning-on of a key switch successively on a time-serial basis;

means for deciding whether or not a change between said successive pressure values is smaller than a predetermined value representative of an error level; and     means for deciding that said pressure sensor means suffers from abnormality when said change in the pressure value is smaller than said predetermined value.

* * * * *